United States Patent [19]

Feldman

[11] 3,849,178

[45] Nov. 19, 1974

[54] THERMAL PROTECTIVE PROCESS AND ARTICLE COATED WITH THERMAL PROTECTIVE COMPOSITION

[75] Inventor: Rubin Feldman, Ladue, Mo.

[73] Assignee: T.S.I., Inc., St. Louis, Mo.

[22] Filed: Apr. 10, 1972

[21] Appl. No.: 242,733

Related U.S. Application Data

[63] Continuation-in-part of Ser. No. 93,416, Nov. 11, 1970, abandoned.

[52] U.S. Cl. ................ 117/72, 106/15 FP, 117/33, 117/76 A, 117/136, 117/137, 161/403, 252/81
[51] Int. Cl. ........................ C09k 3/28, C09d 5/18
[58] Field of Search .................. 117/136, 137, 98; 106/15 FP; 252/8.1; 260/448.2 N

[56] References Cited
UNITED STATES PATENTS

| | | | |
|---|---|---|---|
| 2,514,268 | 7/1950 | Walter | 117/136 X |
| 2,680,077 | 6/1954 | Nielsen et al. | 117/137 X |
| 2,804,398 | 8/1957 | Hooks | 117/136 X |
| 3,022,190 | 2/1962 | Feldman | 117/37 |
| 3,284,216 | 11/1966 | Kaplan | 117/137 X |
| 3,475,375 | 10/1969 | Yates | 117/137 X |
| 3,714,047 | 1/1973 | Marion et al. | 252/8.1 X |

Primary Examiner—Ralph Husack
Attorney, Agent, or Firm—Polster and Polster

[57] ABSTRACT

An improved temperature control composition which when heated above a predetermined temperature range maintains its substrate in that temperature range by undergoing a highly endothermic transition from a solid to a vapor and intumescing to form a continuous porosity (open cell) matrix through which the vapor is forced. A preferred composition is based on the reaction product of a silicate with an amine salt. The composition may be manufactured in sprayable, brushable, trowelable or castable consistencies. It may also be integrated into a structural matrix, such as by incorporation or injection into a honeycomb structure, to produce a self functioning entity. The vapor is capable of undergoing endothermic decomposition at a temperature which it may reach within or adjacent the matrix. Certain additives may be included in the composition to alter its physical and chemical properties.

36 Claims, No Drawings

3,849,178

THERMAL PROTECTIVE PROCESS AND ARTICLE COATED WITH THERMAL PROTECTIVE COMPOSITION

CROSS-REFERENCE TO RELATED APPLICATION

This application is a continuation-in-part of my copending application Ser. No. 93,416, filed Nov. 11, 1970, now abandoned.

BACKGROUND OF THE INVENTION

This invention relates to a novel method for protecting materials from thermal extremes and from flame, and for dissipating heat at a high rate and in a closely predetermined range of temperatures. It also relates to certain novel compositions which are highly effective in carrying out the method, and to methods for making the compositions.

Numerous thermal protective methods and compositions are known. Each has certain applications in which it performs reasonably satisfactorily, but each is also limited in its range of uses and in its effectiveness even in the uses for which it is particularly adapted. Some of the processes and compositions include processes which involve the use of a passive insulative material such as a foamed cement or an intumesced silicate having a low thermal conductivity. Others involve the use of a material which intumesces when heated to form a thick closed cell protective layer over the material protected. Examples of this type of process are the coating of materials such as wood with materials such as silicate solutions or an ammonium phosphate-containing paint or one of the materials disclosed in Nielsen et al., U.S. Pat. No. 2,680,077. Still other processes involve the use of compositions which react when heated to produce a flame-retardant gaseous layer over the materials protected. Still others involve the use of compounds which sublime at a predetermined temperature, as disclosed in my U.S. Pat. No. 3,022,190.

One of the objects of this invention is to provide a process which may perform any of the functions described and which is far more effective and efficient in most applications than processes known heretofore.

Another object is to provide compositions which are extremely effective in performing the process and which are essentially unaffected by humidity, fungus, temperature extremes below certain critical temperatures, and storage.

Still another object is to provide such compositions which are relatively inexpensive to produce and which may easily be varied in their physical and chemical properties, including the temperatures at which the process is carried out.

Other objects will become apparent to those skilled in the art in the light of the following description.

SUMMARY OF THE INVENTION

In accordance with one aspect of this invention, generally stated, a thermal or flame protective process is provided which comprises applying to a material to be protected a composition which intumesces and undergoes an endothermic phase change from a solid to a vapor in a well defined temperature range. The term "applying" is used herein in the broad sense of coating, impregnation and incorporation. The phase change may include sublimation, chemical rearrangement or chemical decomposition, or some combination thereof. At the predetermined temperature range the compositions form a continuous porosity matrix which is appreciably thicker than the original material and through which the vapor is forced. Because the present system does not rely merely on the production of an insulative layer but on the active movement of gases through the matrix between the virgin composition below the matrix and the ambient, the thickness of the intumesced layer will generally not be as great as in systems producing a closed cell foamed layer, although the matrix may be on the order of several times the thickness of the original material. The intumesced layer thus forms in a stationary or low velocity system the functional equivalent of a boundary layer in a high velocity system such as a reentrant ballistic nose cone protected by the method of my Pat. No. 3,022,190. Because the surface of this layer may reach temperatures far in excess of the predetermined temperature at which the material undergoes a phase change, the heat flux is greatly reduced and the efficiency of the process greatly increased.

Preferably the vapor is capable of undergoing endothermic decomposition to lower molecular weight products. Also in the preferred embodiment, the same component of the composition both intumesces and undergoes a phase change. In other embodiments, an additional intumescing component is included in the composition. In a typical application, the gaseous product of the phase change reaches a temperature at which it decomposes while it is still within the matrix. Also in the preferred embodiments, other effects are made use of to increase the efficiency of the process, as will be discussed more fully hereinafter.

The compositions of the invention include an active component which undergoes an endothermic phase change from solid to vapor in a well-defined temperature range and a binder, which together form a continuous porosity matrix, to carry out the process of the invention.

Compositions which have been found to be particularly effective in carrying out the method of the invention are produced by reacting a silicate with a product formed by reacting an amine with an acid. In the preferred embodiment the amine is a primary aromatic amine, but other amines may also be used. The silicate is preferably in the form of an aqueous solution of an unsubstituted alkali metal silicate, although substituted silicates such as aluminosilicates are also usable and are preferred for some purposes. These compositions are essentially complex silicate salts of the amine. Other active components may be used in compositions for practicing the process of the invention. The suitable characteristics of such components are that they undergo a phase change from solid to vapor in a well-defined temperature range under the expected flame or high temperature conditions and that the phase change be endothermic. The latter requirement is dictated by the fact that its function in the thermal protective process is not merely to form with the binder an insulative foam layer (as in many prior art processes), but to be an active heat absorbing and exchanging medium in an active protective system.

As alternatives to the preferred phase-changing component, materials which sublime (change state from solid to gas without a substantial melting phase) under the extreme thermal conditions for which the thermal protective composition is designed are preferred because of the generally highly endothermic nature of sublimation and because the temperature of sublimation is unaffected by the heat flux to which the material is exposed. Of course, materials which after sublimation decompose endothermically in the matrix are desirable. Examples of suitable subliming materials and their approximate temperatures of sublimation (in degrees Celsius) include those set out in my aforesaid Pat. No. 3,022,190, having temperatures of sublimation up to 551°C. (ammonium iodide, 1,023.8°F.; column 11, line 23), and the following:

| | |
|---|---|
| Diphenylamine | 103° |
| Benzyl Benzoic Acid (o) | 114° |
| Benzyl Benzoic Acid (m) | 107° |
| Benzyl Benzoic Acid (p) | 155° |
| Bromosalicylic Acid | 140° |
| 1-Chloroanthraquinone | 162° |
| Formylthioaldehyde | 150° |
| Chlorodinitrophenol | 81° |
| Diamino Phenyl Ethane | 135° |
| Dibromo Aniline | 100° |
| Dibromo Benzoic Acid | 171° |
| Dichloro Benzoic Acid | 140° |
| Dichloro Hexane | 151° |
| Dichloroquinone | 120° |
| Dihydroxy-o-xylene | 136° |
| Dimethyl Benzoic Acid | 165° |
| Penanthrene | 139° |
| Dimethylquinone | 124° |
| Dinitronaphthalene | 145° |
| Dinitrophenol | 115° |
| Propyl Benzoic Acid | 116° |
| Antimony Trifluoride | 292° |
| Para-nitroaniline Bisulfate | 200° |

Because the heat flux of most fires will fall within a relatively narrow range (2–10 BTU/sec./sq.ft.), it is also possible to use compositions which are solids at usual working temperatures (e.g. under 150°F) and which undergo a highly endothermic decomposition to at least one gaseous product in a desired temperature range when exposed to such a fire. Examples of suitable materials and their nominal decomposition temperatures (in degrees Celsius) are:

| | |
|---|---|
| Amino Benzal Dioxime | 71° |
| Amino Phenol | 184° |
| Azophenitole | 91° |
| Benzoyl Acetic Acid | 103° |
| Bromo Ethyl Phthalamide | 82° |
| Bromo Hydroquinone | 113° |
| Dibenzoyl Disulfide | 135° |
| Dichloroacridine | 169° |
| Dichloromaleic Acid | 120° |
| Antimony Oxychloride | 170° |
| Ammonium Hypophosphate | 290° (melts and decomposes) |
| Barium Bromate (hydrate) | 260° |
| Ferric Potassium Oxalate | 230° |

The binder, in the case of the preferred composition, may for example be simply an excess of silicate solution or may be a resinous binder. The characteristics of suitable binders are that they do not resist intumescence at the predetermined temperature at which the active component of the composition undergoes a phase change, and that they form with the active component an open cell matrix rather than a closed cell structure. Preferably, the resinous binders have a low carbonization index. However for some uses a high carbonization index binder may be used or even preferred. Preferably, the binder softens at a temperature slightly above the nominal temperature at which the vapor forming ingredient undergoes its phase change. It is also desirable that components in the binder form, in some cases with the active component, a matrix which hardens to retain an intumesced structure after intumescence ceases and which resists high temperatures. It is also highly desirable that the binder be self healing when the composition is applied to a surface as a coating. Other binders which may be suitable for particular purposes include, for example, nitrocellulose, phenolic modified acrylonitrile butadiene rubber, polysulfide polymers plus epoxy resin; other oxygen silicon polymers, acrylics, polyesters, and polyvinyl chlorides.

The compositions may also include optional ingredients to alter their physical and chemical characteristics. For example, the addition of a strong base such as NaOH or KOH to the preferred compositions increases the formation of binder or filler, flexicizes the matrix, minimizes or prevents cracking and enhances adhesion by etching some types of structures. This viscosity of the compositions may be varied virtually at will by varying the relative proportion of the binder and by varying the viscosity or identity of the binder. The compositions may also be modified for applications requiring low reflectivity (epsilon) and absorbance (alpha) (such as a confined fire) or for those requiring a low alpha over epsilon ratio (such as an outdoor fire), by the addition of materials which, at the wavelengths of expected heat flux, have desirable alpha and epsilon values. For example, magnesium oxide, zirconium oxide and aluminum oxide are highly reflective. The use of both a silicate and a carbon-containing compound has been found to be advantageous in forming an extremely hard and reflective surface of silicon carbide under some fire conditions. This surface is not a continuous skin. Such a skin would destroy the continuous porosity of the matrix, and would therefore prevent the movement of vapor from the virgin material through the matrix to the ambient and would therefore defeat the process of the invention.

The temperatures at which the preferred compositions of this invention intumesce and undergo an endothermic phase change may be varied widely. For example, the sodium salt of the composition formed by a process of treating nitroaniline with concentrated sulfuric acid and thereafter reacting this product with sodium silicate solution yields a composition which maintains a temperature circa 220°F. When this composition is reacted with ammonium chloride, the resultant composition maintains a temperature of circa 550°F. Other changes in the composition of the preferred embodiment may be made to change the predetermined temperature range maintained by the compositions of this invention.

The uses of the method and compositions of this invention will be apparent to those skilled in the art. By way of example, they may be used in lieu of the compositions disclosed in my Pat. No. 3,022,190 for the various purposes set out therein. When used to protect high velocity systems, they produce greatly stretched boundary layers, and as has been pointed out above, when used in low velocity systems they produce the functional equivalent of a boundary layer. They may also be used as fire-protective coatings on structural and non-structural items, or for fireproofing otherwise flammable materials such as paper, wood or fabric, or as active components of highly specialized heat exchangers having critical space and weight requirements.

DESCRIPTION OF THE PREFERRED EMBODIMENT

A preferred embodiment of a composition of this invention, having highly desirable properties in carrying out the process of this invention in a wide range of applications, has as its active ingredient the reaction product of an aqueous silicate solution, obtainable for example from water glass, with the reaction product of an aromatic amine, illustratively nitroaniline, with a strong acid, such as sulfuric or phosphoric. Although these ingredients are presently preferred, they are not the only ones which will give workable compositions for the method of this invention.

The physical and chemical characteristics of the compositions may be enhanced for certain applications by the use of various additives.

The following examples are illustrative of the preferred method of making the preferred embodiments of compositions of the invention.

EXAMPLE 1

A "part A" is made by mixing equimolar quantities of p-nitroaniline and concentrated sulfuric acid with stirring and cooling until the reaction mixture solidifies. The solid material is washed, filtered and ground. A "part B" consisting of aqueous sodium silicate (40°Be) is mixed with part A, in a ratio of part B to part A of about 4 to 1. At the completion of a reaction between the part A and the part B, the resulting thermal protective composition has the viscosity of paint.

This composition is applied as a coating to a wooden panel. When exposed to flame under conditions conforming to American Society for Testing Materials or Underwriters' Laboratories standards, the coating undergoes an endothermic phase change, giving off a vapor at about 220°F and simultaneously intumescing to form a thick char layer many times the thickness of the original coating. This phase change is highly endothermic, on the order of about 750 BTU per pound. At about 400°F the vapour undergoes a highly endothermic decomposition to low molecular weight products.

The composition as applied is very brittle and tends to crack as it ages. Upon intumescing the char layer cracks along seam lines between boards making up the test substrate and limited combustion occurs along the crack line.

EXAMPLE 2

A part A and part B are prepared as in Example 1 and mixed in the same ratio as in Example 1. However, concentrated sodium hydroxide amounting to 10% of the total weight of the composition is added to the reaction mixture.

The resulting paint is applied as a coating to a wooden panel and shows the same thermal properties as the composition of Example 1. However, the composition as applied is much softer than the composition of Example 1 and resists cracking far better both upon aging and when subjected to flame. A coating of 0.015 inch on the flame side of the wood provides zero flame spread when exposed to flame for a period of 10 minutes. Fuel contributed and smoke developed are also zero.

EXAMPLE 3

A thermal protective composition prepared according to Example 2 is applied to a flexible sheet of polyvinyl chloride (PVC). The coated sheet is heated to cure the thermal protective composition and a contact adhesive is then applied over the thermal protective composition. This sheet is slit into strips approximately 1 inch wide and is wound spirally around a 2 inch diameter galvanized iron pipe to a thickness of 0.1 inch. The PVC film protects the thermal protective composition from the environment. When exposed to flame, the PVC substrate decomposes, but the thermal protective composition remains adhered to the pipe and provides a thermostatic pipe wall temperature of about 220°F for a period of 30 minutes.

EXAMPLE 4

A flexible sheet in the form of a woven fiberglass tape is impregnated with the thermal protective composition of Example 2, which is then cured by heating. A contact adhesive is applied to one face of the impregnated tape and the tape is spirally wound on a 1 inch copper pipe. Thermostatic control at about 220°F is again observed.

Not only may the flexible sheet substrate be varied from those of Examples 3 and 4, but the thermal protective coating may also be varied to include, for example, those prior art active compositions hereinbefore mentioned.

EXAMPLE 5

A porous disc of powdered and sintered steel is vacuum impregnated with the composition of Example 2. When heated above about 220°F, the thermal protective composition undergoes an endothermic phase change and simultaneously intumesces to exude a foamed char layer on both sides of the disc.

EXAMPLE 6

A part A is prepared by mixing p-nitroaniline with concentrated phosphoric acid, drying the solid product and grinding it. A part B is made by reacting aluminum oxide with sodium hydroxide and silicic acid to form an aluminosilicate. This part B is reacted with stoichiometric quantities of part A, and boric acid and antimony trisulfide and with about 15% by weight of potassium hydroxide and about 1% by weight of potassium permanganate. The resulting mastic may be applied as a coating. Such coatings are unaffected by humidity, fungus, temperature (below the critical temperature) or accelerated storage. The coatings are hard surfaced and yet self-healing. The thermal properties of the composition are closely similar to those of Examples 1 and 2.

A coating of 0.25 inch of the composition of this Example is applied to each of the inner surfaces of a standard steel exterior load bearing wall having an overall thickness of 2¼ inches. The two faces are separated by girths and a 1½ inch fiberglass mat. Thermocouples are mounted in the top (no flame) surface, three at optimum test locations and one at the most severe thermal short location. The fire source is controlled in the manner set out in UL procedure No. 263 (revised June, 1964) from about 1300°F at 10 minutes to about 1850°F at 2 hours. The thermocouple located at the most severe thermal short location experiences a temperature rise of 255°F, and the average temperature rise of the four thermocouples is 176°F.

EXAMPLE 7

The composition of Example 6 is dried and ground to a powder. The ground solid is mixed with an epoxy resin in a solids to resin ratio of about 1:2. The resin is a commercially available material having a low carbonization index. The epoxy resin is mixed with an initiator and applied to a wooden test specimen. When exposed to flame, the coating intumesces at least as vigorously as the material of Example 2 to provide a protective char layer, and the active ingredient undergoes an endothermic phase change at about 220°F, to provide within the char layer a protective gaseous layer which decomposes endothermically while still in the char layer to form a low molecular weight noncombustible gaseous protective layer above the char layer.

Numerous other natural and synthetic resins may be substituted for the epoxy resin of this Example, including for example, polyurethanes, silicones, phenolics, or protein binders. It has been found desirable that the binder soften at a temperature slightly above the nominal temperature at which the active ingredient undergoes its phase change, so that the binder does not sag before it intumesces.

EXAMPLE 8

A composition is made as in Example 6 except that titanium oxide is substituted for aluminum oxide and part B is added to the reaction mixture in a three-fold excess. The resulting composition is a paint which may be applied by brushing, spraying or dipping. It has a nominal bond strength of 100 psi, has a flexibility sufficient to permit a 180° bend over a 2¼ inch diameter cylinder without cracking or debonding and is able to withstand the impact of a 4-pound ball dropped from the height of 12 feet without damage. It also is highly resistive to such environmental factors as humidity, fungus, temperature and aging.

The lower (flame) side of a 200-pound corrugated cardboard sheet is coated with the thermal protective composition of this Example to a thickness of 5 to 10 mils, and the coating is allowed to cure. The protected cardboard is then exposed to a natural gas-air flame in a preheated oven. The test is run according to Underwriters' Laboratories standards with a flame temperature of 1400°F and an oven temperature of 1200°F, and a draft is induced through the oven comparable to 3 inches of water pressure drop. At the end of the 10-minute exposure period to the fire environment, the corrugated cardboard has not ignited. There is no flame spread. Some of the cardboard has begun to pyrolyze, but because pyrolysis, unlike combustion, is generally endothermic, the remarkable ability of this material to prevent flame spread causes the substrate to absorb rather than contribute energy to the system.

EXAMPLE 9

A thermal protective composition is made in the same manner as in Example 1 except that ammonium chloride is added in stoichiometric proportions to part A. The resulting composition is extremely similar to the composition of the foregoing Example, except that it undergoes an endothermic phase change from solid to gas at a temperature of about 550°F rather than about 220°F. Decomposition of the resulting gaseous material occurs almost immediately under most flame conditions.

This composition is foamed mechanically with the addition of asbestos fibers as physical reinforcement. The foam is cast in 2-inch thick slabs. The slabs have sufficient rigidity to be used as structural elements, provide excellent thermal insulation below about 550°F, and provide many hours of protection to elements and areas behind them under fire conditions.

EXAMPLE 10

A thermal protective composition is made as in Example 8 except that p-phenylenediamine is substituted for p-nitroaniline. The resulting composition undergoes an endothermic phase change from solid to vapor at a temperature of about 200°F at atmospheric pressure. The composition has physical and chemical properties similar to those of Example 8.

The composition of this Example is injected into the corrugations of a sheet of corrugated cardboard and is also applied as a thin coating to the surfaces of the sheet. As thus protected, the sheet is able to withstand a fire for an extended period before the upper (no flame) side pyrolyzes and the sheet collapses.

EXAMPLE 11

The following is an example of a different composition for protecting material by the process of the invention. The following materials are mixed in the indicated proportions by dry weight:

| | Parts by Weight |
|---|---|
| Molybdenum hexacarbonyl | 60 |
| Epoxy Resin | 15 |
| Polysulfide Polymer | 15 |
| Inorganic Fibers | 10 |

The ingredients are thoroughly mixed with sufficient perchloroethylene to form the desired consistency, a curing agent is added (such as tridimethylaminomethyl phenol) and the product is sprayed onto the inner surfaces of a hollow steel structure, as in Example 6, using airless spray equipment. Upon heating under the conditions of Example 6, the composition intumesces to form continuous porosity matrix and the sublimation of the Molybdenum hexacarbonyl through the matrix to the ambient tends to maintain a thermostatic temperature of about 230°F. The composition provides a somewhat shorter period of protection than the composition of Example 6, under these test conditions. Because of the relatively low thermostatic temperature of this composition, it is also usable for protecting flammable material such as wood or paper. In these latter uses, the fibers are preferably omitted. When used, the fibers are preferably made of quartz or glass, to provide a source of silicon to react with the organic binder to form silicon carbide at the matrix surface.

EXAMPLE 12

A composition is made which is identical with that of Example 11 except that half of the molybdenum hexacarbonyl component is replaced by ammonium paranitroaniline orthosulfonate. The ammonium p-nitroaniline ortho-sulfonate component undergoes an abrupt phase change (which appears from TGA analysis to be sublimation but which leaves a substantial residue) to a vapor at 500°F. Therefore the composition intumesces to form an open cell matrix when the material reaches the 230°F sublimation temperature of the molybdenum hexacarbonyl component, and the higher temperature active component undergoes its phase change to a vapor only when the material reaches the higher temperature. This produces a still more efficient and long-lasting protective coating than the previous Example. Of course, it will be understood that the temperature differential across the intumesced matrix will be sufficient that both processes will occur at different depths simultaneously. Although the use of the high temperature component by itself would make the composition unsuitable for protecting flammable material such as wood, the two component system, because of its mode of operation, does have utility for this purpose.

EXAMPLE 13

|  | Parts by Weight |
| --- | --- |
| Ammonium fluoroborate | 70 |
| Epoxy Resin | 10 |
| Polyester Resin | 10 |
| Quartz Fibers | 5 |
| Magnesium Oxide | 5 |

The various ingredients are mixed with sufficient methylene chloride to give the desired consistency and sufficient of a curing agent to cure the epoxy resin. When applied to steel, allowed to dry, and exposed to a 2000° flame the composition intumesces to form a continuous porosity matrix and the ammonium fluoroborate sublimes through the matrix. The composition is highly reflective and provides long-term protection of the steel substrate.

Although the polyester binder in this example softens at a temperature substantially below the temperature of sublimation of the ammonium fluoroborate (about 530°F), it does not run, and an open celled matrix is formed when the ammonium fluoroborate begins to sublime.

EXAMPLE 14

The composition of Example 11 is sprayed onto a steel beam. While the composition is still tacky, powdered aluminum oxide is sprayed onto its surface. The aluminum oxide does not form an impenetrable skin at high temperatures, but it does reflect heat efficiently, thereby prolonging the life of the protective coating when it is exposed to thermal extremes.

EXAMPLE 15

A composition identical with that of Example 13 is prepared, except that potassium fluoroborate is substituted for ammonium fluoroborate. Coatings of the composition behave in the same qualitative manner as the compositions of Example 13, but maintain a thermostatic temperature of about 650°F. Although less efficient than compositions containing the ammonium salt, those containing the potassium are more resistant to humidity and are therefore preferred in uses where they may be exposed to water.

EXAMPLE 16

As an example of a composition which contains a component which decomposes, the following is given:

|  | Parts by Weight |
| --- | --- |
| Ammonium hypophosphate | 55 |
| Bentonite | 5 |
| Epoxy Resin | 30 |
| Polyester Resin | 8 |
| Quartz Fibers | 2 |

The ingredients are mixed with a suitable organic solvent such as perchlorethylene and a curing agent is added for curing the epoxy. At about 550°F the ammonium hypophosphate melts and then decomposes endothermically to form with the binder a continuous porosity matrix.

When applied to steel, this composition provides highly efficient and long-lasting protection, even under the most extreme flame conditions.

Although the foregoing examples have indicated particular uses for particular compositions, it will be immediately apparent to those skilled in the art that many of the illustrative compositions are usable for many of the illustrative uses, and many other compositions and many other uses of the compositions, all within the scope of the appended claims, will occur to those skilled in the art. Merely by way of illustration, other aromatic amines, other acids, other silicates and other additives may be used in making the preferred compositions of the invention. Suitable materials of these descriptions are so well known that no extensive list is needed. Entirely different compositions may be utilized to carry out at least some of the methods of the invention. In selecting particular compositions for particular applications, one should consider not only the temperature which the composition tends to maintain, but such factors as the possible sources of the fire or other thermal extreme, the nature of the materials to be protected, and the environment of the protected materials.

Having thus described the invention, what is claimed and desired to be secured by Letters Patent is:

1. A process of protecting at least a part of an element from flame or extreme thermal conditions comprising applying to said part of said element a protective composition, at least a substantial part of said composition intumescing to form a continuous porosity matrix and undergoing an endothermic phase change from a solid to a vapor in a well-defined predetermined temperature range below the temperature of said flame or thermal extreme.

2. The process of claim 1 wherein the phase change is directly from a solid state to a vapor.

3. The process of claim 1 wherein said vapor undergoes endothermic decomposition at a temperature above said predetermined temperature and below the temperature of said thermal extreme or flame.

4. The process of claim 1 wherein a binder portion of said protective composition softens at a temperature at least about as great as the temperature at which another portion undergoes a phase change.

5. The process of claim 1 wherein said composition comprises a binder and a silicate salt of the reaction product of an organic amine and a strong mineral acid.

6. The process of claim 5 wherein said organic amine is an aromatic amine.

7. The process of claim 6 wherein said aromatic amine is p-nitroaniline.

8. The process of claim 1 wherein said part of said element is cellulose.

9. The process of claim 1 wherein the protective composition is applied to the part by coating a surface of the part with the protective composition.

10. The process of claim 1 wherein the protective composition intumesces and undergoes an endothermic phase change from a solid to a vapor at a temperature of from about 200°F to about 1,000°F.

11. A process for protecting at least a part of an element from flame or extreme thermal conditions comprising applying to said part of said element a protective composition, said composition comprising first means for undergoing an endothermic phase change from a solid to a vapor in a well-defined predetermined temperature range below the temperature of said flame or thermal extreme, and binder means for binding said composition to said substrate and for softening in said temperature range to form with said first means an intumesced continuous porosity matrix through which said vapor passes to reach the ambient.

12. The process of claim 11 further comprising curing said protective composition at a temperature below said predetermined temperature range.

13. The process of claim 11 wherein the predetermined temperature range is chosen to be no less than about 200°F and no greater than about 1,000°F.

14. The process of claim 11 wherein the binder means comprise a thermoplastic organic resin.

15. The process of claim 11 wherein the binder means is an aqueous silicate solution.

16. The process of claim 11 wherein said first means comprise the reaction product of an aqueous silicate with a product formed by reaction of an aromatic amine with an acid.

17. The process of claim 16 wherein the amine is p-nitro aniline.

18. The process of claim 16 wherein the acid is chosen from the group consisting of sulfuric acid and phosphoric acid.

19. The process of claim 16 wherein the silicate is chosen from the group consisting of unsubstituted silicates, aluminosilicates and silicotitanates.

20. The process of claim 16 wherein said predetermined temperature range is chosen to be no less than about 200°F and no greater than about 550°F.

21. The process of claim 11 wherein said first means comprise the reaction product of an aqueous silicate taken from the group consisting of unsubstituted silicates, aluminosilicates and silicotitanates, with a product formed by the reaction of an aromatic amine taken from the group consisting of p-nitroaniline and p-phenylenediamine with an acid chosen from the group consisting of sulfuric acid and phosphoric acid.

22. The process of claim 11 wherein said first means sublimes in said predetermined temperature range.

23. The process of claim 22 wherein said first means decompose endothermically at a temperature above its sublimation temperature but below the temperature of said flame or thermal extreme.

24. An article of manufacture comprising a substrate and a thermal protective composition applied to said substrate for protecting said substrate from fire or thermal extreme, said composition comprising first means for undergoing an endothermic phase change from a solid to a vapor in a well-defined predetermined temperature range below the temperature of said flame or thermal extreme, and binder means for binding said composition to said substrate and for softening at a temperature below the temperature of said flame or thermal extreme to form with said first means a continuous porosity matrix through which said vapor passes to reach the ambient.

25. The article of claim 24 wherein said substrate is cellulosic.

26. The article of claim 24 wherein said composition is applied as a coating to said substrate, and including a coating of a material having a higher reflectivity to infra red rays than said composition, applied over said composition and bonded thereto, said coating being permeable to said vapor at a temperature at which said phase change occurs.

27. The article of claim 24 wherein said vapor undergoes endothermic decomposition at a temperature above said predetermined temperature and below the temperature of said thermal extreme or flame.

28. The article of claim 24 wherein said binder means softens at a temperature at least about as great as the temperature at which said first means undergoes a phase change.

29. The article of claim 24 wherein said first means comprise a silicate salt of the reaction product of an organic amine and a strong mineral acid.

30. The article of claim 29 wherein said organic amine is an aromatic amine.

31. The article of claim 30 wherein said aromatic amine is p-nitroaniline.

32. The article of claim 30 wherein the protective composition intumesces and undergoes an endothermic phase change from a solid to a vapor at a temperature of from about 200°F to about 550°F.

33. The article of claim 24 wherein said binder means comprise a silicate.

34. The article of claim 24 wherein said binder means comprise an organic resin.

35. The article of claim 24 wherein the protective composition intumesces and undergoes an endothermic phase change from a solid to a vapor at a temperature of from about 200°F to about 1,000°F.

36. The article of claim 24 wherein said first means comprise the reaction product of an aqueous silicate taken from the group consisting of unsubstituted silicates, aluminosilicates and silicotitanates, with a product formed by the reaction of an aromatic amine taken from the group consisting of p-nitroaniline and p-phenylenediamine with an acid chosen from the group consisting of sulfuric acid and phosphoric acid.

* * * * *